UNITED STATES PATENT OFFICE.

WILLIAM F. McNABB AND RAYMOND S. WILE, OF PITTSBURGH, PENNSYLVANIA; SAID WILE ASSIGNOR TO SAID McNABB.

HEAT-PRODUCING COMPOUND.

1,126,055. Specification of Letters Patent. Patented Jan. 26, 1915.

No Drawing. Application filed October 28, 1913. Serial No. 797,745.

*To all whom it may concern:*

Be it known that we, WILLIAM F. McNABB and RAYMOND S. WILE, residents of Pittsburgh, in the county of Allegheny and State of Pennsylvania, have invented a new and useful Improvement in Heat-Producing Compounds, of which the following is a specification.

This invention relates to heat producing compounds.

The object of the invention is to provide a new and improved compound, which when mixed with water produces large quantities of heat without flame or combustion, and which compound can be manufactured at low cost and is stable under normal conditions.

A further object of the invention is to provide a heat producing compound whose reaction with water produces no odorous or combustible gases and which is therefore uninflammable, may be safely used under any conditions, and which particularly can be used without danger for removing residual obstructions from oil or gas wells.

A further object of the invention is to provide a heat producing compound which combines with water to form an alkaline solution whose caustic solvent effect may be utilized for attacking oils or greases and other like substances, which are usually insoluble and are not attacked by most compounds of this character.

The composition and the proportions of the various substances in my improved heat producing compound may be varied within a wide range of equivalents. It consists essentially of a combination or mechanical mixture of an alkaline peroxid with metallic aluminum. The alkaline peroxid may be of an alkaline earth metal, such as calcium, magnesium or strontium, but preferably is either sodium or potassium peroxid, or mixtures thereof, of commercial strength, although the nearer it is to chemical purity, the better is the compound. In the preferred form of the mixture sodium peroxid is used, on account of its comparative cheapness and because it is more easily procured in the open market. The metallic aluminum is in a finely divided condition, such as aluminum filings or dust, but may be any other comminuted or finely divided form of the metal. The proportions of peroxid and aluminum are usually about 3 or 4 to 1 by weight, although they may be varied in accordance with circumstances, the general rule being that the reaction is more violent and a better effect is produced as the proportion of peroxid is increased. Preferably, a quantity of alkaline carbonate is also added to the mixture. This may be any alkaline carbonate, such as the carbonates of the alkaline earth metals above named, or the normal sodium or potassium carbonate, or the acid carbonate of either metal, or mixtures thereof, and may be either chemically pure or the commercial form. The best substance for general use is common soda ash on account of its cheapness and the fact that it can always be readily purchased in the open market. This material usually contains about 58 to 60 per cent. of normal sodium carbonate, but its strength may vary, and the more nearly pure it is the better. However, such other substances as the commercial soda ash contains as impurities do not affect the chemical reactions taking place and merely increase the total weight of material necessary to produce a given effect.

We have found that excellent results may be obtained by the use of a mixture containing the various substances in about the following proportions:

Alkaline peroxid ($Na_2O_2$)_____ 4 ounces.
Alkaline carbonate (commercial soda ash)_____ 5½ ounces.
Metallic aluminum (filings)____ 1½ ounces.

As before stated, however, the proportions of the substances may be varied within wide limits and we do not wish to be limited to any particular mixture or proportions, that named being merely illustrative. Good results are obtained by using less peroxid, and as the cost of the mixture depends to a great extent upon the quantity of peroxid used, the proportions will depend upon several factors, for example, whether the particular use justifies the cost of more peroxid or whether it demands a violent or merely a moderate reaction.

We have found in practice that the addition to the mixture of a quantity of metallic zinc improves the reaction without greatly increasing the cost. The zinc may be in the form of dust, filings or any other finely divided or comminuted form of metallic zinc. Its action is uncertain. It may act merely as a catalytic agent and by its mere presence in the mixture promote reaction between the other substances in the compound, but there is reason to believe that it combines chemically with some of the other agents to form alkaline zincates. About 1 ounce of zinc is used in a mixture of the proportions indicated in the above example, although more or less may be used as desired. The various substances to form the compound are weighed out in the proper proportions and are then mechanically mixed or incorporated into a homogeneous mass in any desired manner.

The material may be used in any case where it is desired to produce heat without flame or combustion, but it is particularly useful for removing obstructions from conduits, such as sink drain pipes, sewer pipes, oil or gas well pipes and the like. For cleaning out a sink drain a quantity of the mixture, prepared in about the proportions indicated in the above example, is dumped into about two quarts of water. The mixture is stirred until the action becomes violent and the water with the material therein is then dumped into the sink pipe. Obstructions in sink drains usually consist of an oily or greasy base which traps and collects other solid substances. The mixture described attacks the obstruction in three ways, by heat, mechanically and chemically. When the mass is thrown into water the peroxid and aluminum combine to form sodium aluminate, liberating oxygen. The alkali or alkaline metals in both the peroxid and carbonate form caustic alkali, such as the sodium or potassium hydrate, and there is an evolution of free carbonic acid gas. The reaction is mainly exothermic and a large amount of latent heat is converted into sensible heat, so that the temperature of the water mixture may reach 200 degrees or even be above boiling. The heat tends to liquefy the greasy substances in the obstruction and expands and frees the same from the conduit. The violent bubbling caused by the evolution of the carbonic acid gas also attacks the obstruction mechanically and tends to free it from the conduit and cause the liquid to penetrate into and under the mass. The hydrates produced form a caustic solution which has a solvent action upon the greasy or oily substances. Usually one treatment of the character indicated is sufficient to thoroughly clean any sewer pipe. While the action of the carbonate in the mixture is uncertain it is possible that it may act as a catalytic agent or possibly form with the water an electrolyte which produces or promotes an electrolytic action in the mixture between the zinc and aluminum. However this may be, the presence of the carbonate in the mixture improves the action.

The only gas given off by the reaction is carbonic acid gas, which is odorless and practically inert chemically. The substance is therefore not disagreeable and there is no danger in its use. In this respect it differs from prior compounds, some of which produce an evolution of disagreeable ammonia gas or a free evolution of hydrogen, which is inflammable and may produce explosions.

Our improved compound may be safely used for removing residual obstructions which frequently form at the bottoms of gas and oil wells and which consist of a spongy, oily or greasy mass. By pouring a mixture of our compound and water down the well tube the residual obstruction is dissolved, and the gas formed has no effect upon the well and is not liable to produce an explosion or ignite the same.

What we claim is:

1. A heat producing compound, comprising the combination of an alkaline peroxid and aluminum and an alkaline carbonate.
2. A heat producing compound, comprising the combination of the peroxid of an alkaline metal and aluminum and an alkaline carbonate.
3. A heat producing compound, comprising the combination of sodium peroxid and aluminum and an alkaline carbonate.
4. A heat producing compound, comprising the combination of an alkaline peroxid, aluminum and the carbonate of an alkaline metal.
5. A heat producing compound, comprising the combination of the peroxid of an alkaline metal, aluminum and the carbonate of an alkaline metal.
6. A heat producing compound, comprising the combination of sodium peroxid, aluminum and the carbonate of an alkaline metal.
7. A heat producing compound, comprising the combination of an alkaline peroxid, aluminum and soda ash.
8. A heat producing compound, comprising the combination of the peroxid of an alkaline metal, aluminum and soda ash.
9. A heat producing compound, comprising the combination of sodium peroxid, aluminum and soda ash.
10. A heat producing compound, comprising the combination of an alkaline peroxid, aluminum and zinc.
11. A heat producing compound, comprising the combination of the peroxid of an alkaline metal, aluminum and zinc.
12. A heat producing compound, comprising the combination of sodium peroxid, aluminum and zinc.
13. A heat producing compound, comprising the combination of an alkaline peroxid, aluminum, an alkaline carbonate and zinc.

14. A heat producing compound, comprising the combination of the peroxid of an alkaline metal, aluminum, an alkaline carbonate and zinc.

15. A heat producing compound, comprising the combination of sodium peroxid, aluminum, an alkaline carbonate and zinc.

16. A heat producing compound, comprising the combination of an alkaline peroxid and aluminum in the proportions of 1½ ounces of aluminum to from 1 to 4 ounces of peroxid.

17. A heat producing compound, comprising the combination of sodium peroxid and aluminum in the proportions of 1½ ounces of aluminum to from 1 to 4 ounces of peroxid.

18. A heat producing compound, comprising a combination of an alkaline peroxid and aluminum in the proportions of 1½ ounces of aluminum to from 1 to 4 ounces of peroxid, and an alkaline carbonate.

19. A heat producing compoud, comprising the combination of sodium peroxid and aluminum in the proportions of 1½ ounces of aluminum to from 1 to 4 ounces of peroxid, and an alkaline carbonate.

20. A heat producing compound, comprising the combination of an alkaline peroxid, aluminum and soda ash in the proportions of 1½ ounces of aluminum, from 1 to 4 ounces of peroxid, and from 1 to 5½ ounces of soda ash.

21. A heat producing compound, comprising the combination of an alkaline peroxid and aluminum in the proportions of 1½ ounces of aluminum to from 1 to 4 ounces of peroxid, and zinc.

22. A heat producing compound, comprising the combination of sodium peroxid and aluminum in the proportions of 1½ ounces of aluminum to from 1 to 4 ounces of peroxid, and zinc.

23. A heat producing componnd, comprising the combination of an alkaline peroxid and aluminum in the proportions of 1½ ounces of aluminum to from 1 to 4 ounces of peroxid, an alkaline carbonate and zinc.

24. A heat producing compound, comprising the combination of sodium peroxid and aluminum in the proportions of 1½ ounces of aluminum to from 1 to 4 ounces of peroxid, an alkaline carbonate and zinc.

25. A heat producing compound, comprising the combination of sodium peroxid, soda ash, aluminum and zinc in substantially the proportions of 4 ounces of peroxid, 5½ ounces of soda ash, 1½ ounces of aluminum and 1 ounce of zinc.

In testimony whereof, we have hereunto set our hands.

WILLIAM F. McNABB.
RAYMOND S. WILE.

Witnesses:
 ELBERT L. HYDE,
 WILLIAM B. WHARTON.

Copies of this patent may be obtained for five cents each, by addressing the "Commissioner of Patents, Washington, D. C."